United States Patent
Beyer et al.

(10) Patent No.: US 11,110,791 B2
(45) Date of Patent: Sep. 7, 2021

(54) HYBRID MODULE FOR A DRIVE TRAIN OF A HYBRID VEHICLE AND SUCH A DRIVE TRAIN

(71) Applicant: Schaeffler Technologies AG & Co. KG, Herzogenaurach (DE)

(72) Inventors: Robin Beyer, Kehl (DE); Torsten Pieper, Weingarten (DE); Rolf Meinhard, Bühl (DE); Marcus Hoppe, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 68 days.

(21) Appl. No.: 16/491,293

(22) PCT Filed: Feb. 13, 2018

(86) PCT No.: PCT/DE2018/100120
§ 371 (c)(1),
(2) Date: Sep. 5, 2019

(87) PCT Pub. No.: WO2018/161993
PCT Pub. Date: Sep. 13, 2018

(65) Prior Publication Data
US 2020/0016971 A1    Jan. 16, 2020

(30) Foreign Application Priority Data

Mar. 6, 2017 (DE) .......................... 102017104581.3
Dec. 8, 2017 (DE) .......................... 102017129280.2

(51) Int. Cl.
*B60K 6/40* (2007.10)
*B60K 6/50* (2007.10)
(Continued)

(52) U.S. Cl.
CPC .................. *B60K 6/50* (2013.01); *B60K 6/38* (2013.01); *B60K 6/40* (2013.01); *B60K 6/48* (2013.01);
(Continued)

(58) Field of Classification Search
CPC ... B60K 6/50; B60K 6/38; B60K 6/40; B60K 6/48; B60K 6/387; F16C 17/26; B60Y 2400/42; F16D 13/52
See application file for complete search history.

(56) References Cited

U.S. PATENT DOCUMENTS

| 2008/0023287 A1* | 1/2008 | Thiede | B60K 6/40 |
| | | | 192/48.1 |
| 2009/0008212 A1* | 1/2009 | Combes | B60K 6/48 |
| | | | 192/113.34 |

(Continued)

FOREIGN PATENT DOCUMENTS

| DE | 102014213818 A1 | 1/2016 |
| DE | 102015211436 A1 | 1/2016 |

(Continued)

Primary Examiner — David J Hlavka
(74) Attorney, Agent, or Firm — LeKeisha M. Suggs

(57) ABSTRACT

A hybrid module for a drive train of a vehicle includes an intermediate shaft configured for torque transmission from an internal combustion engine and/or an electric machine to a transmission. The shaft is mounted on a dividing wall by two bearings, wherein a securing element is provided on a transmission side of the dividing wall to fix an axial position of a torque transmission component that can be mounted on the intermediate shaft on a motor/engine side of the dividing wall.

11 Claims, 6 Drawing Sheets

(51) Int. Cl.
*B60K 6/38* (2007.10)
*B60K 6/48* (2007.10)
*F16C 17/26* (2006.01)
*F16D 13/52* (2006.01)

(52) U.S. Cl.
CPC .......... *F16C 17/26* (2013.01); *B60Y 2200/92* (2013.01); *B60Y 2400/42* (2013.01); *F16D 13/52* (2013.01)

(56) References Cited

U.S. PATENT DOCUMENTS

2016/0084363 A1* 3/2016 Steinberger .............. B60K 6/38
    192/3.28
2016/0290480 A1* 10/2016 Sada .................. F16H 57/0447

FOREIGN PATENT DOCUMENTS

| | | |
|---|---|---|
| DE | 102015201931 A1 | 8/2016 |
| DE | 102015211277 A1 | 12/2016 |
| FR | 2995833 A1 | 3/2014 |

\* cited by examiner

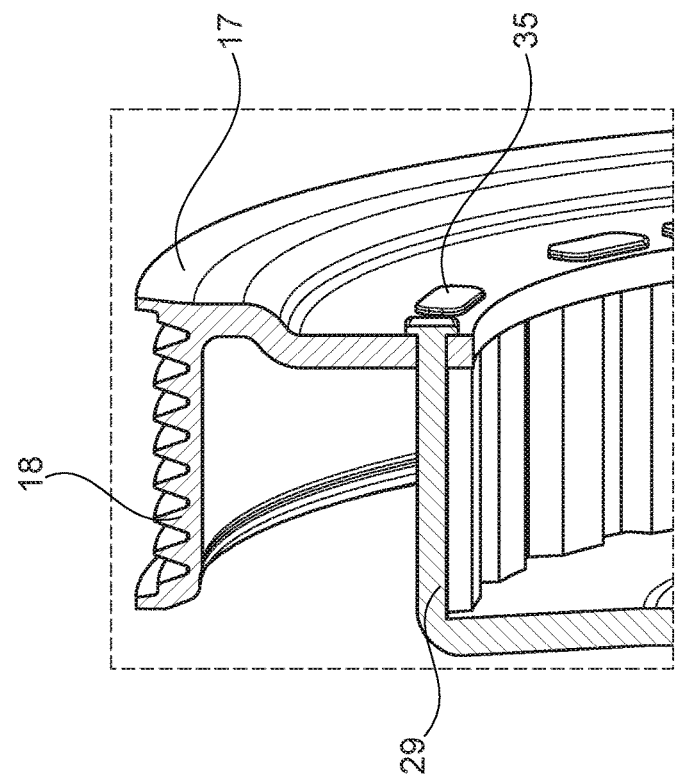
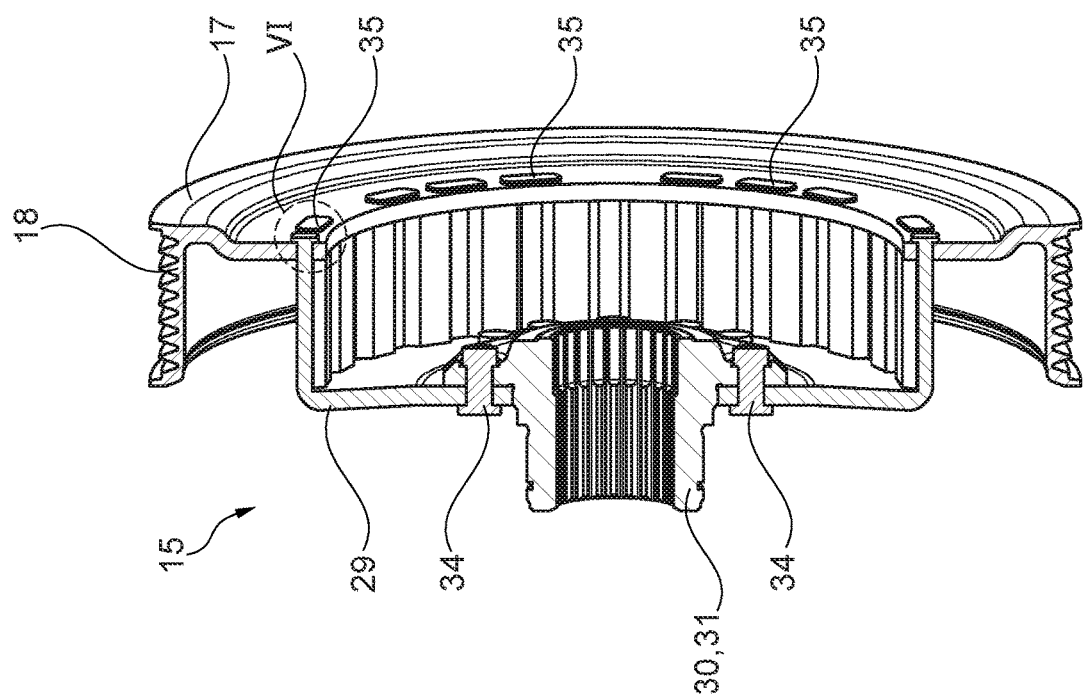

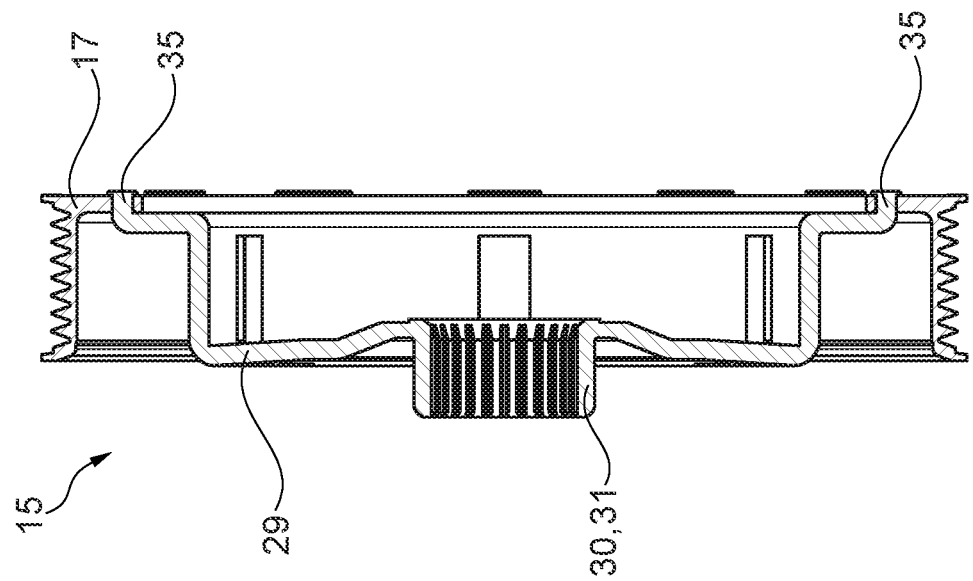
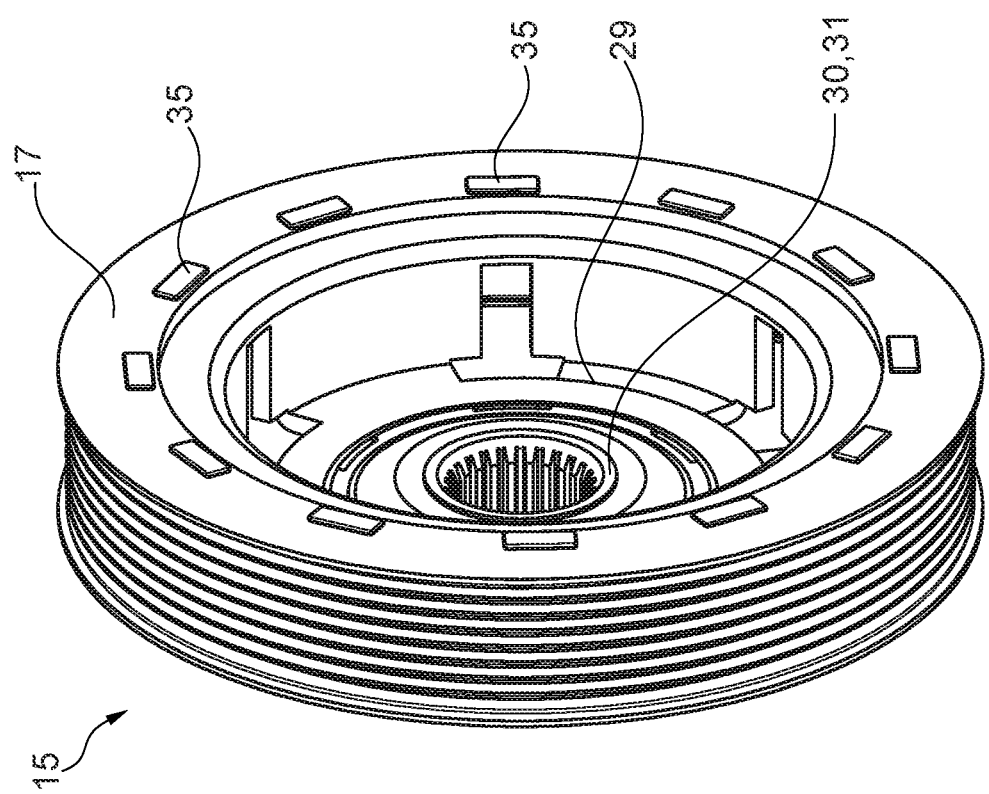

HYBRID MODULE FOR A DRIVE TRAIN OF A HYBRID VEHICLE AND SUCH A DRIVE TRAIN

CROSS-REFERENCE TO RELATED APPLICATIONS

This application is the U.S. National Phase of PCT Appln. No. PCT/DE2018/100120 filed Feb. 13, 2018, which claims priority to DE 102017104581.3 filed Mar. 6, 2017 and DE 102017129280.2 filed Dec. 8, 2017, the entire disclosures of which are incorporated by reference herein.

TECHNICAL FIELD

The present disclosure relates to a hybrid module for a drive train of a (hybrid) vehicle, e.g. a passenger car, a heavy goods vehicle or some other commercial vehicle, having an intermediate shaft prepared/designed for torque transmission from an internal combustion engine and/or an electric machine, e.g. an electric motor, to a transmission, said shaft being designed geometrically and in terms of the material thereof in such a way that it can be mounted/supported on a dividing wall by means of two (support) bearings. The present disclosure also relates to a drive train for a (hybrid) vehicle, having an internal combustion engine, a transmission, and a hybrid module, arranged between the internal combustion engine and the transmission.

BACKGROUND

In the case of hybrid systems known from the prior art, in which the hybrid module is arranged between the internal combustion engine and the transmission, an intermediate shaft of the hybrid module is mounted in a dividing wall, a carrier plate or something similar by means of a bearing assembly. A system of this kind is known from DE 10 2015 211 436 A1, for example. This laid-open application describes a drive assembly having an input element for connection to an internal combustion engine and to an electric machine, and having an output element for connecting the drive assembly to a transmission input shaft of a downstream transmission, wherein a friction clutch is provided as a starting element, said clutch coupling the rotor of the electric machine to the output element and to a dog clutch, which couples the internal combustion engine to the input element of the friction clutch when the friction clutch is closed.

In this known system, the intermediate shaft is embodied in such a way that it is possible on the motor/engine side to establish a connection to the separating clutch (K0 clutch), e.g. via a toothed hub. On the transmission side, the intermediate shaft is provided with a flange surface to enable a connection to the starting clutch (K1 clutch) to be established. In this context, a starting clutch of this kind can be embodied as a single clutch, double clutch or multidisk clutch.

In the known systems, the intermediate shaft coming from the transmission side is mounted in the dividing wall. The separating clutch is arranged on the intermediate shaft by means of a shaft-hub connection, for example, and is secured axially from the motor/engine side, e.g. by means of screw fastening. As an alternative, the separating clutch can also be fixed axially on the intermediate shaft by means of a nut, a retaining ring or similar securing elements.

With the known systems, it is disadvantageous that the axial securing means for the motor/engine-side components is situated on the motor/engine side of the intermediate shaft and the axial securing means for transmission-side components is implemented on the transmission side. As a result, assembly is very complex and, under some circumstances, installation space is wasted since two securing elements are required to secure the components axially on the intermediate shaft.

SUMMARY

It is the object of the present disclosure to avoid or at least mitigate the disadvantages of the prior art and, in particular, to provide the axial securing both of the motor/engine-side components and of the transmission-side components on the transmission side, when viewed relative to the dividing wall.

It is thereby possible to dispense with a separate axial securing means arranged on the motor/engine side.

According to the present disclosure, the object of the present disclosure is achieved, in the case of a hybrid module of the type in question, by virtue of the fact that a securing element, e.g. a screw, a nut and/or a securing component combination, provided on a transmission side of the dividing wall fixes/determines the axial position of a torque transmission component, e.g. a separating clutch (K0 clutch) that can be mounted on the intermediate shaft on the motor/engine side of the dividing wall.

This results in advantages for the assembly process, both for clutch manufacturers and for end customers. Moreover, it is thus possible to achieve installation space advantages since components, e.g. the hub, connecting elements etc., are eliminated and the components can be nested more effectively.

Thus, it is advantageous if the hybrid module is mounted/supported on the dividing wall by means of the two (support) bearings.

Here, the two bearings are likewise pushed onto the intermediate shaft from the transmission side.

It is furthermore advantageous if a flywheel, which is arranged on the transmission side in relation to the dividing wall and which is attached in a torque-transmitting manner to the intermediate shaft, is fixed axially by the securing element.

Here, the flywheel can be part of a starting clutch (K1 clutch) arranged on the transmission side. By fixing the flywheel on the intermediate shaft, it is possible to dispense with separate attachment of the K1 clutch to the intermediate shaft. A more compact construction is thereby possible.

It has proven advantageous here if the flywheel has a flange section which is arranged between one of the (support) bearings, preferably that closer to the transmission, and the intermediate shaft. Thus, the flywheel on the transmission side supports one of the bearings and is provided on the inside diameter via an interface or connection, e.g. tooth system, with/to the intermediate shaft.

It is advantageous here if the flange section of the flywheel is arranged between an inner ring of the (support) bearing, preferably that closer to the transmission, which is designed as a rolling bearing for example, and an outer side of the intermediate shaft.

In the embodiment of the flange section, it has proven advantageous if an end face, situated on the motor/engine side, of the flange section is in contact preferably with a side face/end face of an inner ring of the other (support) bearing, preferably that closer to the motor/engine.

As a result, the support bearing closer to the motor/engine is positioned axially from one side by means of the flange section of the flywheel.

It is advantageous here if the outside diameter of the intermediate shaft decreases substantially, preferably in steps, from the motor/engine side toward the transmission side.

It is furthermore advantageous if the intermediate shaft has, on the motor/engine side, a flange-type radial projection, which is preferably formed integrally with the intermediate shaft.

This projection can be used to fasten a carrier element, e.g. a carrier plate having a belt track in the case of axially parallel hybrid systems or having a rotor carrier in the case of coaxial hybrid systems. Moreover, the projection serves as a stop or limitation for the axial positioning of the support bearing closer to the motor/engine from the other side.

It has proven expedient here for the outside diameter of the intermediate shaft to decrease, in particular, from the flange-type radial projection, which can serve as a stop surface for example, in the direction of the transmission side. On the motor/engine side of the flange-type projection, the diameter of the intermediate shaft can be adapted in such a way that this part of the intermediate shaft can be used to mount further components arranged (on the motor/engine side) on the intermediate shaft.

It is advantageous here if the projection serves as a connection to a separating clutch (K0 clutch) or for fastening the latter.

The present disclosure furthermore also relates to a drive train for a (hybrid) vehicle, having an internal combustion engine, a transmission, and a hybrid module according to the present disclosure, arranged between the internal combustion engine and the transmission.

In other words, the present disclosure consists in that the axial securing means (screw) has been relocated from the motor/engine side to the transmission side of the intermediate shaft. The flywheel on the transmission side supports one of the bearings and has an interface or connection (tooth system) with/to the intermediate shaft on the inside diameter. The intermediate shaft itself is as it were mirror-inverted relative to the known prior art. The flange surface of the intermediate shaft is used as a connection to the inner plate carrier (carrier plate with belt track). A further bearing is seated on the intermediate shaft. The embodiment can be used both for axially parallel and for coaxial hybrid systems, referred to as P2 hybrid systems.

In other words, the separating clutch (K0 clutch) is fixed axially on the intermediate shaft from one side of the transmission. A flywheel on the transmission side provides a mounting/support for a bearing and has a flange section on an inside diameter in order to couple the flywheel to the intermediate shaft. A flange section of the intermediate shaft connects the latter to an inner plate carrier or carrier plate having a belt track. A further bearing is arranged on the intermediate shaft. This arrangement can be used in axially parallel or coaxial hybrid systems.

BRIEF DESCRIPTION OF THE DRAWINGS

The present disclosure is explained in greater detail below with the aid of figures, in which different embodiments are illustrated. Of the figures:

FIG. 5 shows the carrier element from FIG. 3 and FIG. 4 in the fitted state;

FIG. 6 shows a detail of area VI from FIG. 5;

FIG. 7 shows a perspective view of the inner plate carrier in a different embodiment; and FIG. 8 shows a section through the embodiment of the inner plate carrier shown in FIG. 7.

The figures are of a purely schematic nature and serve only to aid understanding of the present disclosure. Identical elements are provided with the same reference signs.

Features of the individual illustrative embodiments can also be implemented in other illustrative embodiments. They are therefore interchangeable.

DETAILED DESCRIPTION

Figure 1:
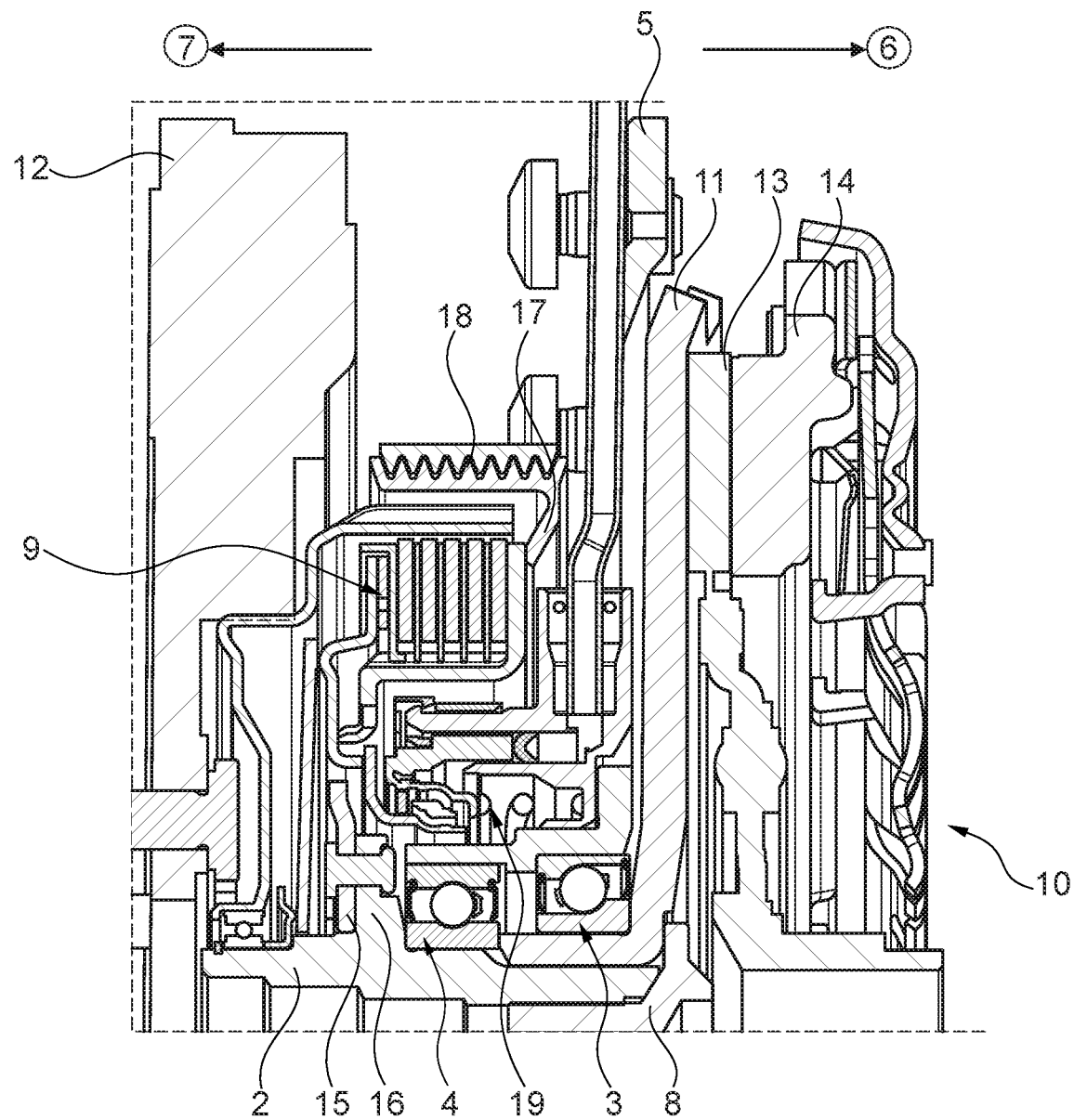
FIG. 1 shows a section through a hybrid module according to the present disclosure with a partial illustration of the motor/engine and transmission attachment.

FIG. 1 shows a section through a hybrid module 1, which is designed as a "P2 hybrid module". A P2 hybrid module is taken to mean a hybrid module which is arranged in a drive train for a vehicle, between an internal combustion engine (on the left in FIG. 1) and a transmission (on the right in FIG. 1).

The hybrid module 1 has an intermediate shaft 2, which is mounted on a dividing wall 5 by means of two (support) bearings 3, 4. In relation to the dividing wall, a distinction is drawn between a transmission side 6 (on the right of the dividing wall 5 in FIG. 1) and a motor/engine side 7 (on the left of the dividing wall 5 in FIG. 1) of the intermediate shaft 2.

Arranged on the motor/engine side of the dividing wall 5 is a separating clutch (K0 clutch) 9, which serves to connect either an internal combustion engine or an electric machine in a torque-transmitting manner to the intermediate shaft 2. Arranged on the transmission side is a starting clutch (K1 clutch) 10, which is connected in a torque-transmitting manner to the intermediate shaft 2 via a flywheel 11. The components arranged on the intermediate shaft 2, including the starting clutch 10 or the flywheel 11, are positioned axially from the transmission side 6 by means of a securing element 8.

A dual mass flywheel 12, which serves to damp the oscillations and vibrations from the internal combustion engine, is furthermore illustrated on the left-hand side of the intermediate shaft 2. The starting clutch 10, which has the flywheel 11 and, inter alia, a clutch disk 13 and a clutch pressure plate 14, is illustrated on the right-hand side of the intermediate shaft 2. The starting clutch 10 serves to transmit torque or to interrupt torque transmission from the intermediate shaft 2 to the transmission (not illustrated).

The separating clutch 9 is arranged on the intermediate shaft 2 and is fastened on a flange-type radial projection 16 of the intermediate shaft 2 via an inner plate carrier 15. In the embodiment illustrated here, the inner plate carrier 15 is embodied as a carrier plate 17 having a belt track 18, which transmits the torque of the electric machine, e.g. an electric motor (not shown here), to the intermediate shaft 2 via the separating clutch 9 when appropriate.

Such an embodiment is preferred especially for axially parallel hybrid arrangements. As an alternative, the fastening of a rotor carrier for the rotor of the electric machine is also conceivable instead of the belt track 18. This embodiment is preferred especially for coaxial hybrid systems.

Here, the separating clutch 9 is illustrated as a "normally closed" clutch, which means that the separating clutch is closed in the unactuated state and is thus connected to the internal combustion engine in a torque-transmitting manner. Actuation of a release mechanism 19 opens the separating clutch 9 and thus connects it to the electric motor in a torque-transmitting manner.

The exact arrangement and positioning of the components on the intermediate shaft 2 is described in detail below with reference to FIG. 2.

Figure 2:
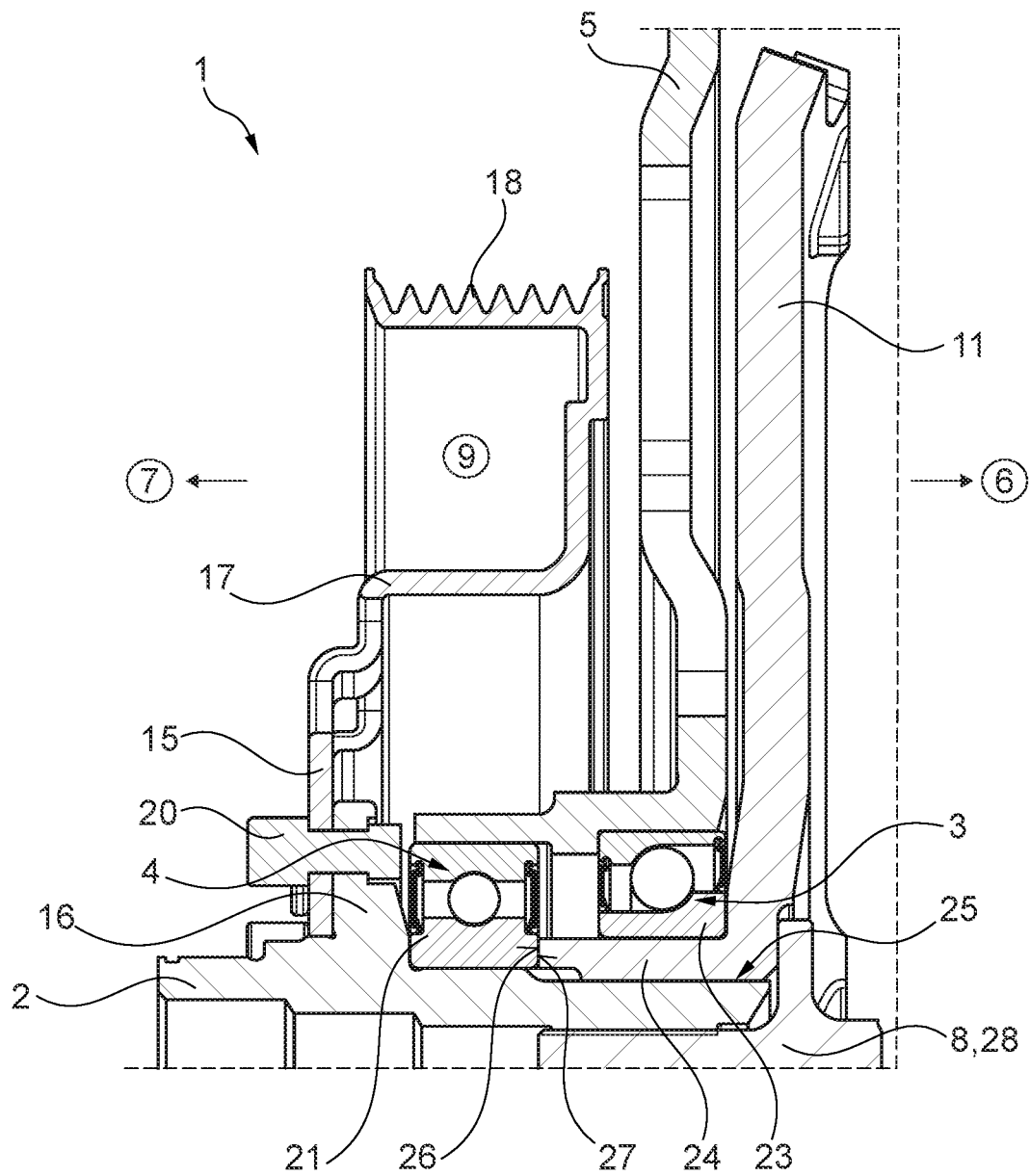
FIG. 2 shows a construction according to the present disclosure of a hybrid module in section.

FIG. 2 shows the hybrid module 1, which in FIG. 1 is arranged between the internal combustion engine (on the left in FIG. 1, not illustrated) and the transmission (on the right in FIG. 1, not illustrated). In order to simplify the illustration of the components essential to the present disclosure, the separating clutch 9 and the starting clutch 10 are not illustrated in FIG. 2, with the exception of the flywheel 11. Only the inner plate carrier 15 of the separating clutch 9, in the form of the carrier plate 17 with belt track 18, is depicted.

The intermediate shaft 2 has an outside diameter which decreases substantially from the motor/engine side 7 to the transmission side 6, with the exception of the flange-type radially outward-projecting projection 16, which is arranged on the motor/engine side of the intermediate shaft 2, in relation to the dividing wall 5. In this arrangement, the intermediate shaft 2 and the projection 16 are of integral design. The flange-type projection 16 serves, on the one hand, for the fastening of or connection to the inner plate carrier 15, which is fastened to the projection 16 with the aid of a rivet 20 in the illustrative embodiment shown here. As an alternative, some other connecting element, e.g. a screw etc., is also conceivable instead of the rivet 20. On the other hand, the flange-type projection 16 serves as a stop surface for an inner ring 21 of the bearing 4 closer to the motor/engine, which limits the movement in the axial direction of the inner ring 21 in one direction (to the left in FIG. 2) as it is pushed onto the intermediate shaft 2.

Here, the bearings 3, 4 are designed as rolling bearings, to be more precise as ball bearings. However, other types of rolling bearing, e.g. roller bearings etc., are also conceivable. The two bearings 3, 4 support the intermediate shaft 2 on the dividing wall 5 or provide a mounting for the intermediate shaft 2 on/in the dividing wall 5. Here, the (support) bearing 3 is designed as an angular contact bearing and is in contact, by means of its outer ring 22, laterally with (a projection) of the dividing wall 5. An inner ring 23 of the bearing 3 closer to the transmission is arranged on or pushed onto a flange section 24 of the flywheel 11. In this case, a side face of the inner ring 23 rests against the flywheel 11.

The flange section 24 of the flywheel 11 extends to the left in the axial direction in FIG. 2 from the flywheel 11 (away from the starting clutch 10) and, on its inside diameter, has an interface or connection 25, by means of which the flywheel 11 is connected in a torque-transmitting manner to the intermediate shaft 2. The interface 25 is in the form of a shaft-hub connection, for example. As a result, the intermediate shaft 2—with the flange section 24 inserted/arranged in between—is supported in/on the dividing wall 5 via the bearing 3.

Moreover, the flange section 24 serves for the axial fixing or positioning of the inner ring 21 of the bearing 4 closer to the motor/engine in that a motor/engine-side end face 26 of the flange section 24 rests against a transmission-side side face 27 of the inner ring 21.

The components arranged on the intermediate shaft 2, including the bearings 3, 4, the separating clutch 9 (see FIG. 1) and the flywheel 11, are positioned in an axially determinate way on the transmission side by means of the securing element 8, in this case in the form of a screw 28.

As an alternative, a nut, a retaining ring or similar securing elements and a combination of a plurality of elements, referred to as a "securing element combination", are also conceivable as securing elements.

By virtue of the embodiment shown here of the intermediate shaft 2 and of the arrangement of the components, it is possible to axially secure or position both the components on the motor/engine side 7 (i.e. on the left of the dividing wall 5) and on the transmission side 6 (i.e. on the right of the dividing wall 5) from the direction of the transmission side 6, using just one securing element 8.

FIG. 3 to FIG. 8 show various embodiments of the inner plate carrier 15.

The inner plate carrier 15 serves, inter alia, to center and guide the plates (not illustrated), to transmit the torque of the internal combustion engine, to transmit the torque of the electric machine, and to provide an interface with the intermediate shaft and with the electric machine, e.g. an electric motor.

In FIGS. 3 to 8, the inner plate carrier 15 is of multi-part design. By virtue of this multi-part design, it is possible to produce the complex geometry of the inner plate carrier 15 with a small number of forming steps. Moreover, degrees of freedom in respect of differences in material thickness, selection of material and heat treatment of the individual components become possible.

The inner plate carrier 15 in the illustrative embodiment shown here has an inner cage 29, the carrier plate 17 with the belt track 18, and a connecting element 30 to the intermediate shaft 2, which is here in the form of a hub 31. In particular, it is possible to dispense with the connecting element 30 if the inner plate carrier 15 is connected to the intermediate shaft 2 in some other way, as shown in FIG. 2 for example.

Figure 3:
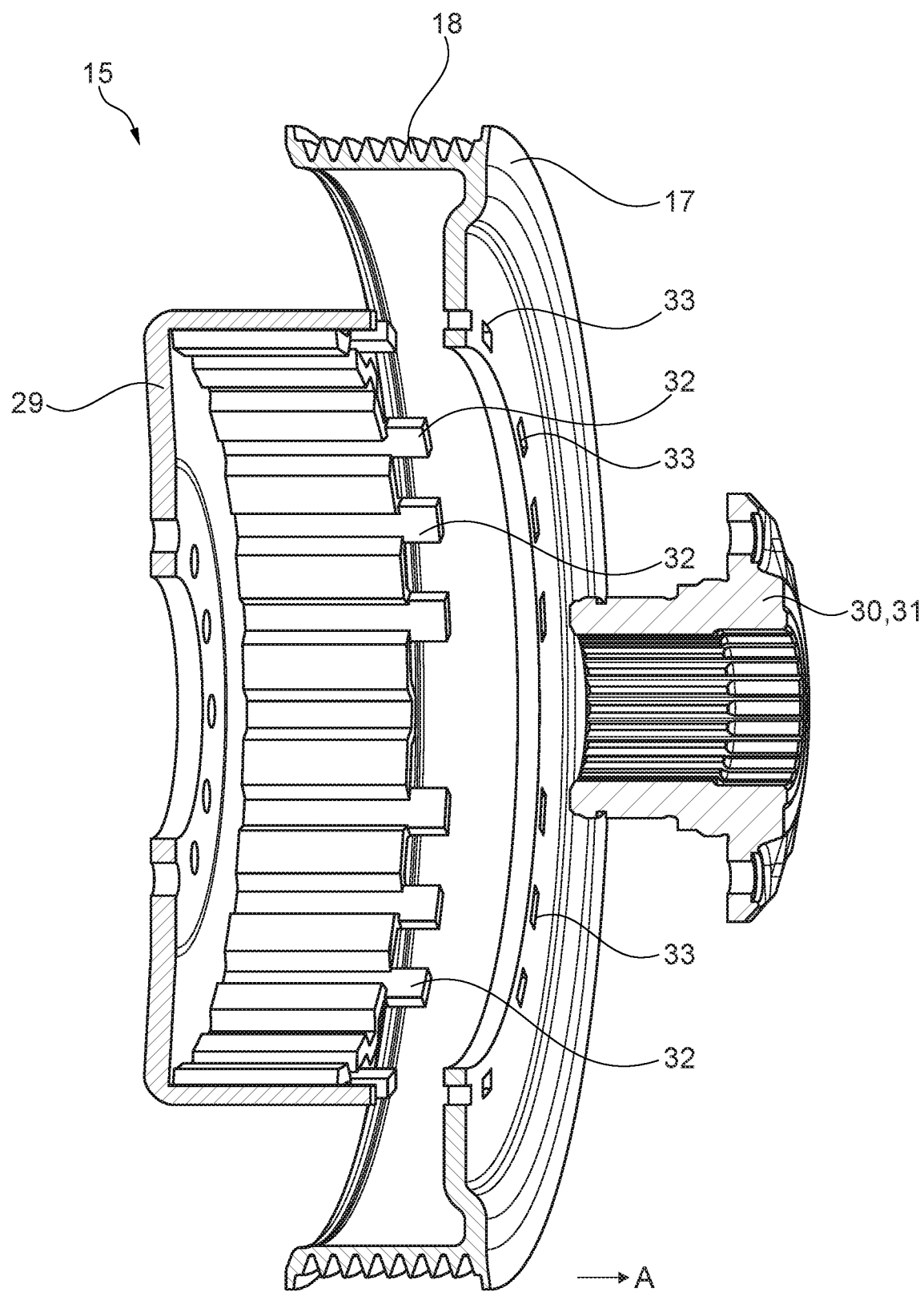
FIG. 3 shows a multi-part embodiment of an inner plate carrier having a carrier plate with a belt track for P2 hybrid systems.
Figure 4:
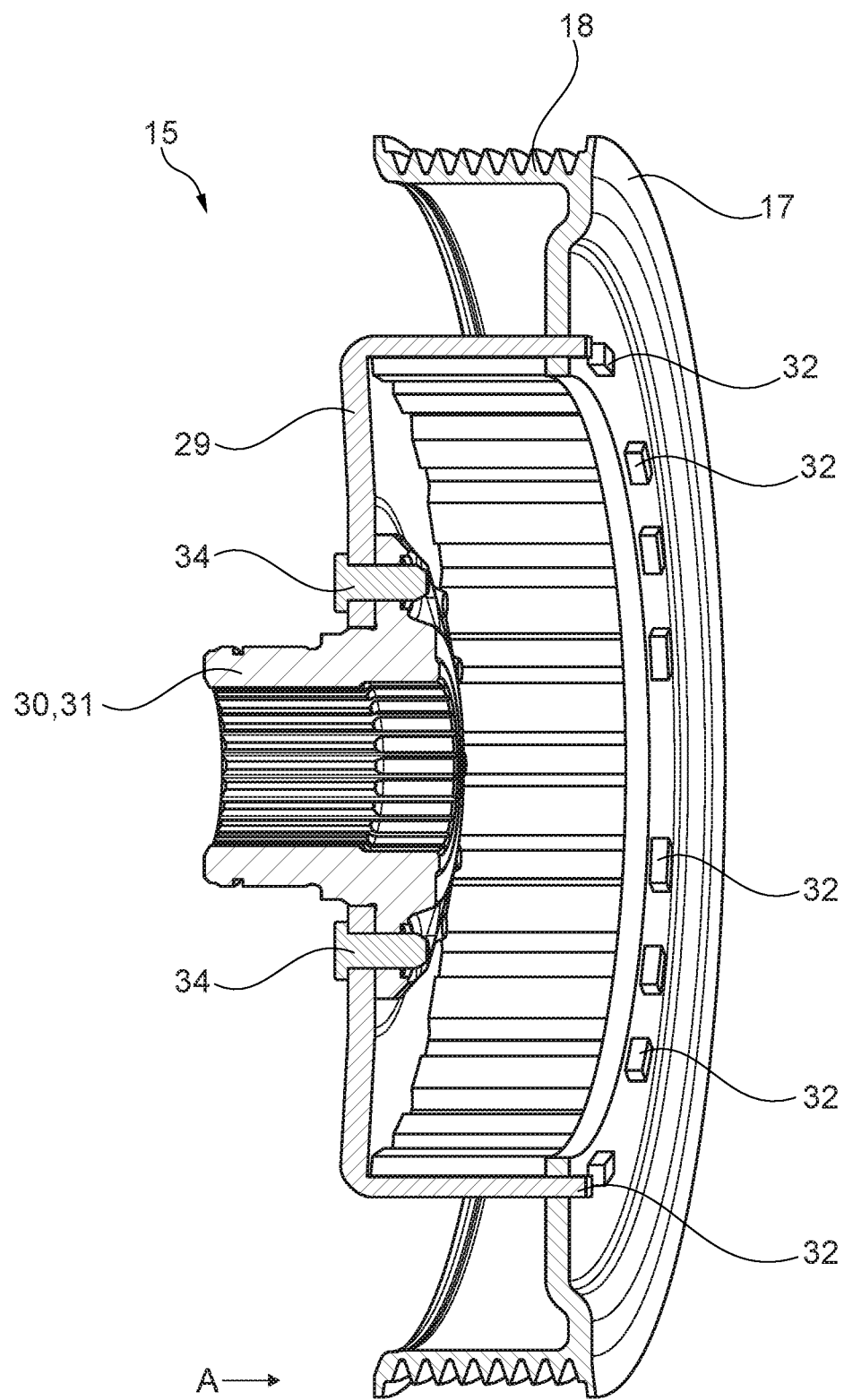
FIG. 4 shows the carrier element from FIG. 3 in the assembled state.

The inner cage 29 has a plurality of fingers 32, which extend along the circumferential direction of the inner cage 29 in an axial direction A in FIG. 3. The carrier plate 17 has windows/apertures/openings 33 corresponding thereto and arranged along the circumferential direction, into which the fingers 32 engage during assembly (see FIG. 4). The hub 31 is fastened on the inner cage 29 with the aid of a plurality of screws 34 (see FIG. 4) arranged along the circumferential direction of the hub 31, for example.

After the fingers 32 have been pushed through the respective windows 33 (see FIG. 4) corresponding thereto, the fingers 32 protrude from the windows 33 in the axial direction and are formed in such a way by means of a forming process, e.g. roller forming or stamping, that the inner cage 29 and the carrier plate 17 are inseparably connected. As shown in FIG. 5 such a forming process can form the ends of the fingers 32, which extend through the windows 33, into closing heads 35. This gives rise to a positive joint, similar to a riveted joint, although additional connecting elements, e.g. rivets, are dispensed with.

FIG. 6 shows the positive joint with the aid of the closing heads 35 once again in an enlarged illustration. By means of this type of joint between the inner cage 29 and the carrier plate 17, it is possible to dispense with overlapping geometries of the kind required for screwed or riveted joints, thereby allowing compact embodiment and thus a reduction in installation space. As compared with a welded joint, a positive joint of this kind does not have any welding distortion or any restriction in respect of the material.

Staked joints of the kind that are already known, for example, for connecting the hub and the hub flange in the case of clutch disks are also conceivable as an alternative type of joint.

FIG. 7 and FIG. 8 show a different further embodiment of the inner plate carrier 15, in which the connecting element 30 is embodied integrally in the form of the hub 31 and the inner cage 29. Here, the region of the hub 31 is embodied in a manner similar to a forged hub and is deep-drawn from the inner cage 29.

By virtue of the multi-part embodiment of the inner plate carrier 15, the individual components can be produced from different materials and/or from various material thicknesses. The following arrangement represents an advantageous combination in this context: the torque introduction element is produced in the form of a hub 31 made from forged steel or cast material, for example. The inner cage 29 is produced from sheet metal with a tooth system for the plates, and the carrier plate 17 with the belt track 18 (as a kind of belt pulley) is likewise produced from sheet metal but with a different sheet thickness. The joint between the hub 31 and the inner cage 29 is formed by means of rivets, whereas the joint between the inner cage 29 and the carrier plate 17 is implemented by means of the forming method described, e.g. in the form of roller forming.

LIST OF REFERENCE SIGNS 1 hybrid module
2 intermediate shaft
3 (support) bearing
4 (support) bearing
5 dividing wall
6 transmission side
7 motor/engine side
8 securing element
9 separating clutch (K0 clutch)
10 starting clutch (K1 clutch)
11 flywheel
12 dual mass flywheel (DMF)
13 clutch disk
14 clutch pressure plate
15 inner plate carrier
16 flange-type radial projection
17 carrier plate
18 belt track
19 release mechanism
20 rivet
21 inner ring
22 outer ring
23 inner ring
24 flange section
25 interface/connection
26 end face
27 side face
28 screw
29 inner cage
30 connecting element
31 hub
32 finger
33 window/aperture/opening
34 screw
35 closing head
A axial direction

The invention claimed is:

1. A hybrid module for a drive train of a vehicle, comprising: an intermediate shaft configured for torque transmission from an internal combustion engine and/or an electric machine to a transmission, the shaft being mounted on a dividing wall by two bearings, wherein a securing element provided on a transmission side of the dividing wall fixes an axial position of a flywheel mounted on the intermediate shaft, wherein the flywheel includes a flange section arranged between the intermediate shaft and a flange section of the dividing wall.

2. The hybrid module as claim 1, wherein the flange section of the flywheel is arranged between one of the two bearings and the intermediate shaft.

3. The hybrid module as claimed in claim 2, wherein the flange section of the flywheel is arranged between an inner ring of the one bearing and an outer side of the intermediate shaft.

4. The hybrid module as claimed in claim 3, wherein an end face, situated on a motor/engine side of the dividing wall, of the flange section of the flywheel is in contact with a side face of an inner ring of the other bearing.

5. The hybrid module as claimed in claim 1, wherein an outside diameter of the intermediate shaft decreases from a motor/engine side of the dividing wall toward the transmission side.

6. The hybrid module as claimed in claim 1, wherein the intermediate shaft has, on a motor/engine side of the dividing wall, a flange-type radial projection, which is formed integrally with the intermediate shaft.

7. The hybrid module as claimed in claim 6, wherein the projection is used as a connection to a separating clutch.

8. A drive train for a vehicle, having an internal combustion engine, a transmission, and a hybrid module as claimed in claim 1, arranged between the internal combustion engine and the transmission.

9. A hybrid module for a vehicle, comprising:
a shaft configured to transmit torque from an engine and/or an electric machine to a transmission, wherein the shaft is mounted on a dividing wall via a first bearing and a second bearing;
a separating clutch mounted on the shaft on a motor/engine side of the dividing wall;
a securing element disposed on a transmission side of the dividing wall; and
a flywheel arranged on the transmission side of the dividing wall and connected to the shaft by the securing element, wherein the flywheel includes a flange section arranged between the first bearing and the shaft, wherein an axial position of the flywheel is fixed by the securing element.

10. The hybrid module of claim 9, wherein the flange section of the flywheel is disposed between an inner ring of the first bearing and the shaft.

11. The hybrid module of claim 9, wherein the first bearing is axially closer to the transmission side of the dividing wall than the second bearing.

* * * * *